No. 630,676. Patented Aug. 8, 1899.
H. C. B. FORESTER.
APPARATUS FOR MANUFACTURING AND PRESSING ARTIFICIAL FUEL.
(Application filed May 18, 1897.)
(No Model.) 4 Sheets—Sheet 3.
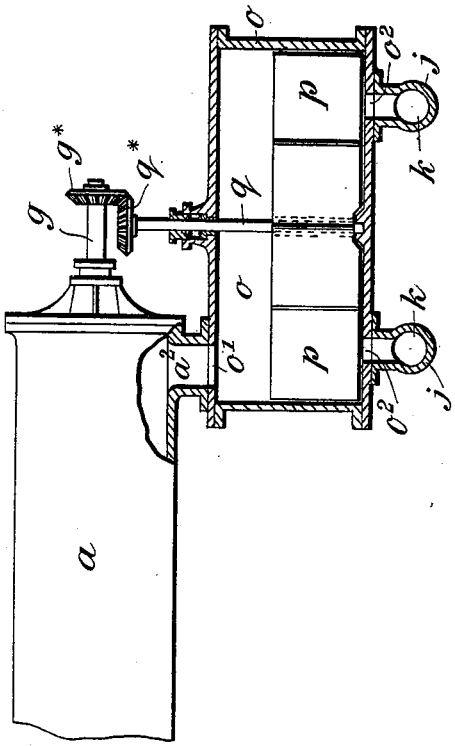
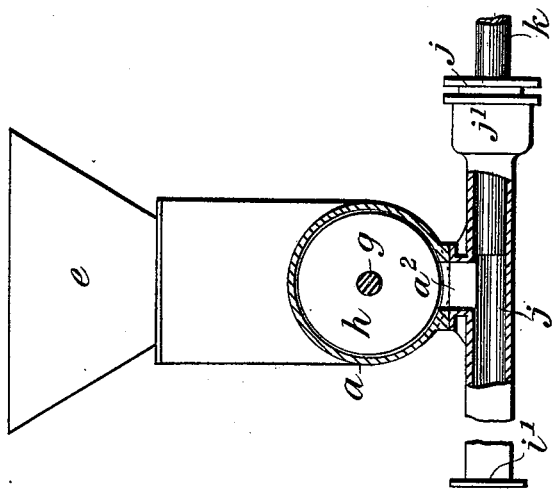
Witnesses:
John C. Wilson
Percy C. Bowen
Inventor:
H. C. B. Forester,
By Whitman & Wilkinson,
Attorneys.
THE NORRIS PETERS CO., PHOTO-LITHO., WASHINGTON, D. C.

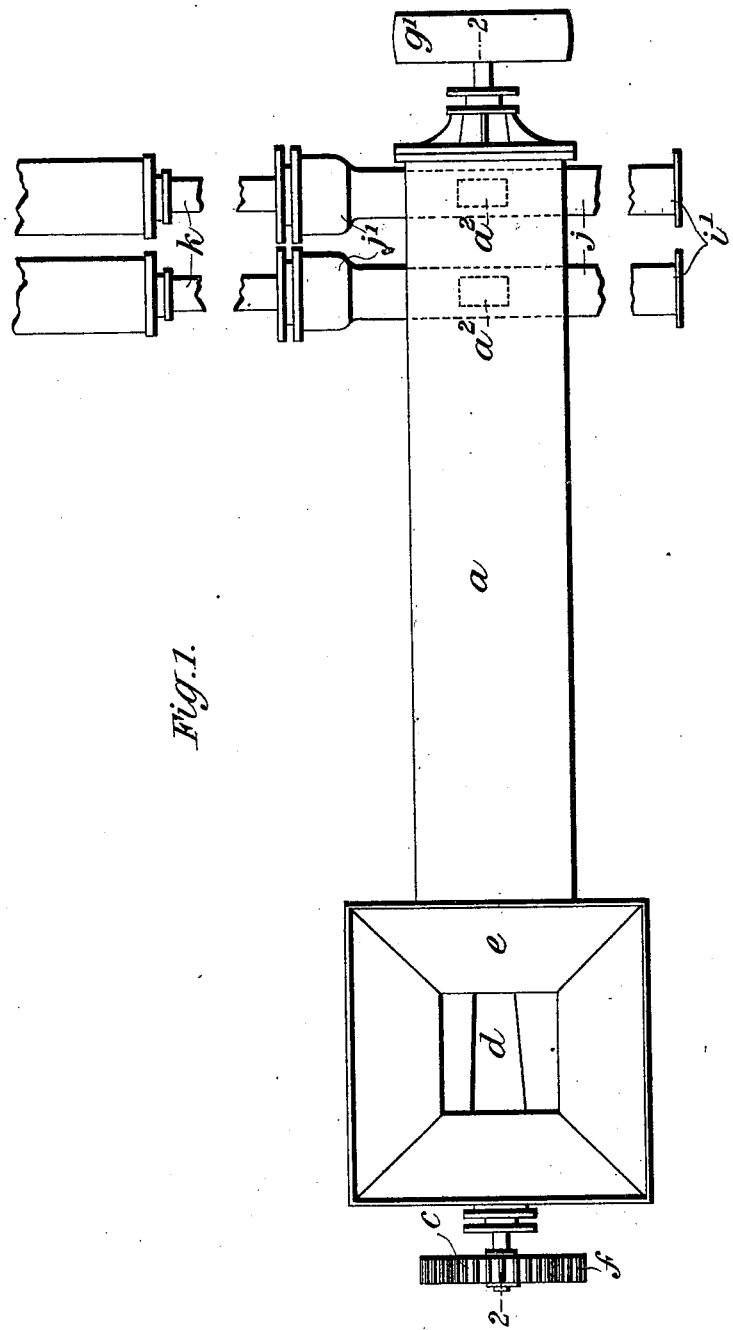

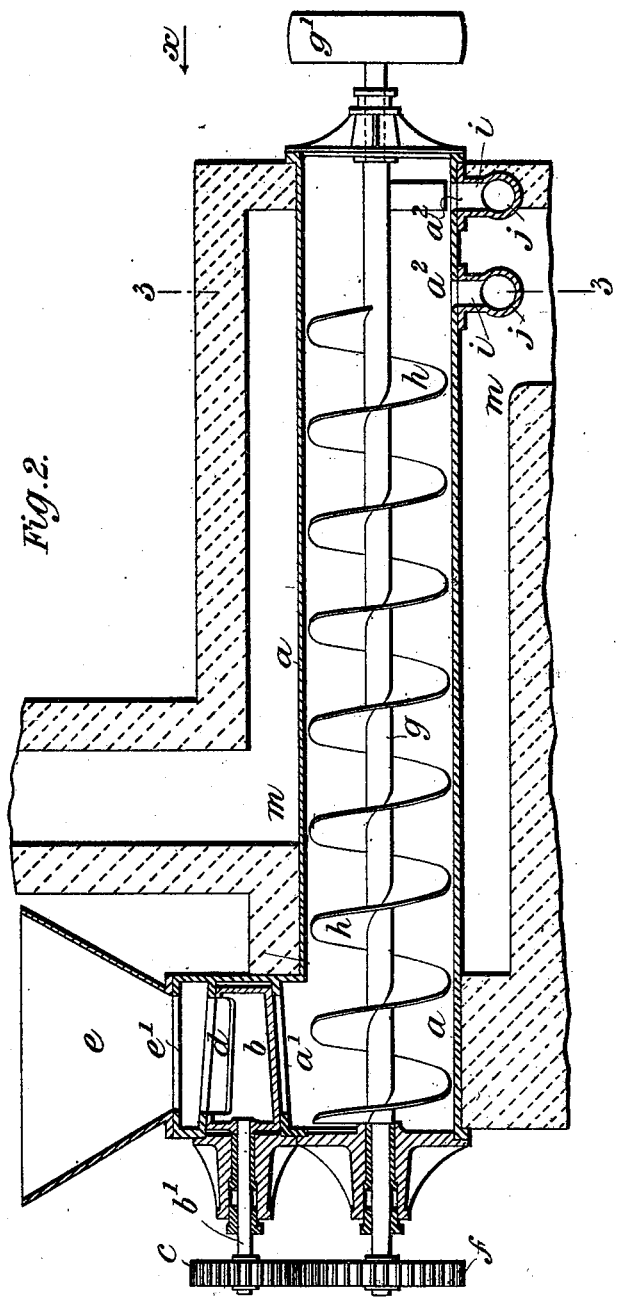

No. 630,676. Patented Aug. 8, 1899.
H. C. B. FORESTER.
APPARATUS FOR MANUFACTURING AND PRESSING ARTIFICIAL FUEL.
(Application filed May 18, 1897.)
(No Model.) 4 Sheets—Sheet 4.
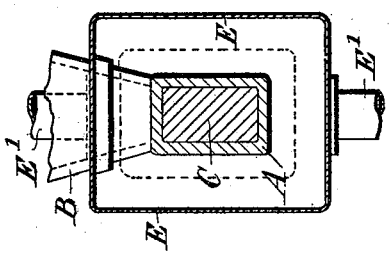
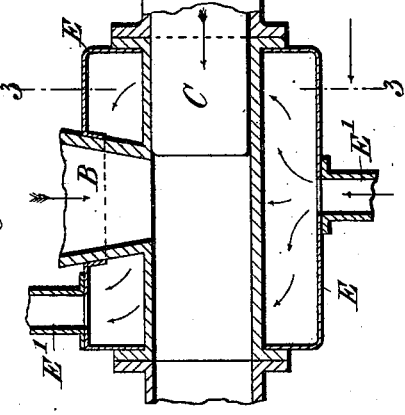
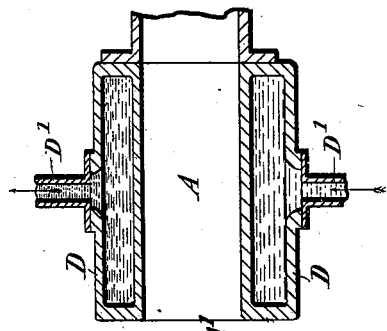
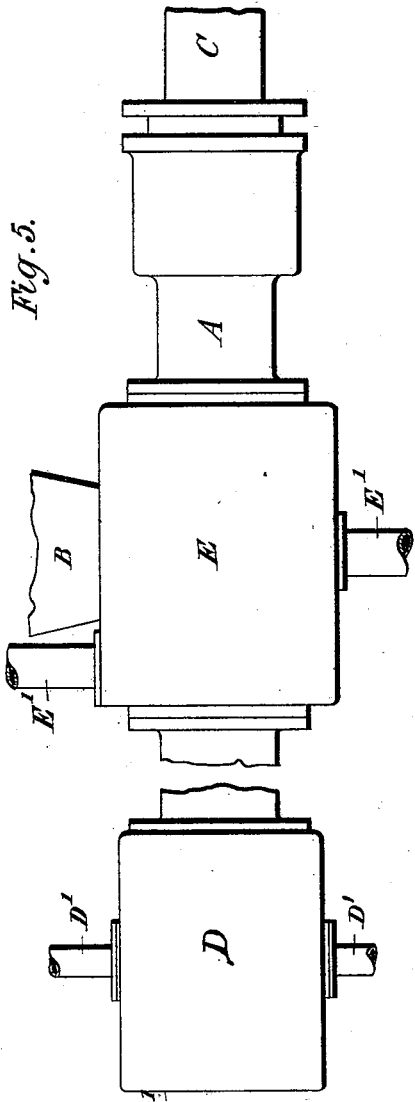
Witnesses:
Inventor:

UNITED STATES PATENT OFFICE.

HERBERT C. B. FORESTER, OF SKETTY, NEAR SWANSEA, ENGLAND, ASSIGNOR TO THE PATENT AGGLOMENT FUEL SYNDICATE, LIMITED, OF SWANSEA, ENGLAND.

APPARATUS FOR MANUFACTURING AND PRESSING ARTIFICIAL FUEL.

SPECIFICATION forming part of Letters Patent No. 630,676, dated August 8, 1899.

Application filed May 18, 1897. Serial No. 637,060. (No model.)

*To all whom it may concern:*

Be it known that I, HERBERT CHARLES BATH FORESTER, engineer, a subject of the Queen of Great Britain, residing at Penybryn, Sketty, near Swansea, Glamorgan county, England, have invented certain new and useful Improvements in Apparatus for Manufacturing and Pressing Artificial or Patent Fuel, of which the following is a specification.

This invention relates primarily to apparatus of a novel and special character for use in the manufacture of artificial fuel or so-called "patent" fuel, and, secondly, relates to apparatus of a novel and special character for pressing (into cubes, blocks, or other suitable form) artifical or so-called "patent" fuel or the like, and while this pressing apparatus is designed more especially for the pressing up or formation of patent fuel into solid form yet it will be obvious that same may be used for pressing any material or materials to which same may be applicable.

I will first describe my complete apparatus for the manufacture of artificial fuel and with reference to Figures 1 to 4 of the drawings hereunto annexed, and then I will describe the second part of my invention relating to the press alone and with reference to Figs. 5 to 7 of the drawings hereunto annexed, the novel and essential features in all of which will be finally pointed out in the claims.

My present invention is as follows: I use a suitable retort or chamber adapted to be heated and capable of bearing heat (and also, if required, capable of resisting internal pressure,) advantageously a cylindrical chamber, (to which the fuel material is fed in any suitable manner) and mounted or supported either horizontally, vertically, or in any other suitable position; but for the sake of example I will describe my invention as carried out with such chamber horizontally mounted on suitable supports. Within this chamber (which I will term the "heated" chamber) I arrange a suitable conveyer—for instance, in the form of an Archimedean screw or screws or worm or series of arms arranged spirally around a shaft or equivalent, so that the material or materials (for forming the artificial fuel) fed into said chamber at or near one end thereof will be gradually "conveyed" or caused to travel to the outlet or outlets from said chamber, which outlet or outlets may advantageously be at or near the opposite end of said chamber. This "conveyer" (Archimedean screw, &c.,) is caused to revolve by any suitable mechanism—for instance, by a shaft fixed thereon passing through the end of the chamber (advantageously through a stuffing-box or other suitable arrangement for making a tight joint where it is desired to keep the aforesaid chamber closed tightly) and said shaft revolved by a pulley and belt thereon operated from any convenient source of power or in any other suitable manner at any suitable speed to deliver the material at the outlet from said chamber.

Instead of the conveyer being formed of an Archimedean screw, as aforesaid, any other suitable conveyer or means may be employed for causing the material (which it is desired to treat in this chamber) to be passed along said heated chamber from the inlet to the outlet, as aforesaid. In a convenient position in connection with the outlet or outlets from said heated chamber I arrange or mount a suitable briquet press or apparatus for pressing artificial or so-called "patent" fuel into a solid form—that is, either into blocks, cubes, or other suitable shape. For instance, I may advantageously combine and arrange with my aforesaid heated chamber and conveyer therein a press or pressing-machine or several presses of the character shown in Figs. 5 to 7 of the drawings hereunto annexed, in which the piston or plunger works in a cylinder to compress the fuel and force same out of an opening at the end of said cylinder finished and ready for use. For making artificial fuel where it is desirable that no escape of gases or volatile matter shall take place from said chamber or pressing apparatus from the time when the material is fed into the aforesaid heated chamber until it exudes from or leaves the apparatus or is forced out of the press pressed into the solid form for this purpose the arrangement for feeding into the heated chamber the material to form the artificial fuel is such that escape of the gases or volatile matter is very small or altogether prevented. For instance, this may be effected by the fuel material being filled into a V-shaped hopper or other suitable feeding device to such a depth that the mass of entering fuel will itself make its own seal to prevent escape of the volatiles at the feed-inlet to said heated chamber, or I may use any suitable means for effecting this object—for instance, suitable feeding-valve.

I will now proceed to describe my present invention with reference to the accompanying drawings.

Fig. 1 is a plan, Fig. 2 a longitudinal sectional view on line 2 2, Fig. 1, and Fig. 3 a cross-section on line 3 3, Fig. 2, looking in the direction of the arrow $x$, of my said combined retort and press.

$a$ is the heated chamber, into which is fed the material to form the artificial fuel. For the purpose of such feeding I may use any suitable means—for instance, a circular valve $b$, adapted to be revolved by the toothed wheel $c$ on the spindle $b'$ of said valve and having a cavity or recess $d$ therein, which cavity alternately coincides with the bottom opening $e'$ of the feed-hopper $e$ or other suitable source of supply of the material and with the inlet or inlets $a'$ into the aforesaid heated chamber $a$ in such manner that while coinciding with the former and during its movement it cuts off all connection with the interior of the said heated chamber $a$ until said cavity has been moved around into coincidence with the aforesaid inlet or inlets $a'$ into said chamber $a$, at which moment it has then cut off all communication with the hopper $e$ or exterior atmosphere, so that the material can thus be fed (in regulated quantities) into the interior of the said heated chamber $a$. This valve $b$ may be caused to revolve by the spur-wheel $c$ on the spindle $b'$, on which this valve $b$ is mounted, the said spur-wheel $c$ gearing with another toothed wheel $f$, fixed on the shaft $g$, which rotates the conveyer, which in the case illustrated is an Archimedean screw $h$, the relative speeds of the valve $b$ and the conveyer $h$, respectively, being such that the former cannot feed the material to the conveyer $h$ quicker than the latter is capable of carrying it away or quicker than the fuel material can be removed from the heated chamber $a$.

Instead of the foregoing rotary valve $b$ a slide-valve with a cavity therein may be arranged to act in a similar manner, or, if desired, two or more of the aforesaid valves or equivalents may be arranged to feed the material into the heated chamber $a$, or all such valves may be dispensed with and the fuel simply fed in a mass into the hopper $e$, and thus form its own seal, as aforesaid.

The outlet or outlets $a^2$ from the heated chamber $a$ communicate only with the inlet or inlets $i$, leading into the respective cylinders $j$ of the compressing apparatus, and the piston-rod or ram $k$ of the press, (in the case illustrated two such presses are shown,) being arranged to pass through suitable stuffing-boxes $j'$ or equivalent, and as the outlet $i'$ from each said compressing apparatus is blocked or completely closed in a gas-tight manner (or approximately so) by the mass of artificial fuel compressed in the respective passage-ways leading to said outlet $i'$ consequently it will be seen that escape of gases or volatile matter from the heated chamber and the compressing apparatus is prevented, (or approximately so,) the communication at $a^2$ and $i$ between the heated chamber $a$ and the compressing apparatus being made in any suitable manner, so as to prevent any escape of volatiles at such point.

The heated material as it enters the cylinder $j$ is by the reciprocation of the ram or plunger $k$ compressed into a solid mass, (if necessary, the end of the cylinder $j$ at the start being temporarily closed in any suitable manner to cause the mass to be tightly compressed against the sides of the cylinder, and thereafter such closure is removed,) and the now-compressed mass is at each successive stroke of the ram or plunger $k$ thereby caused to advance along the cylinder and part of said compressed mass thereby exuded or forced out of the outlet $c'$, while at the same time the resistance offered by said compressed mass (by reason of the friction of same against the inside of said cylinder $j$) is such as to cause the compression between same and the ram-head or plunger of the fresh material received into the cylinder at each reciprocation of said plunger $k$. The amount of such resistance may be regulated in any desired manner. For instance, the same may be increased by prolonging the length of the cylinder or tube $j$ to any desired extent beyond the limit of movement of the ram or plunger or by forming the part beyond the ram slightly conical or tapered in any desired manner, or the same may be made adjustable or expansible either in section or otherwise.

$g'$ is a belt-pulley on the end of the conveyer-shaft $g$, by which the latter is revolved. I have found it a convenient arrangement (though I do not limit myself thereto) to arrange duplicate compressing apparatus, such as illustrated, in which the plungers or rams are each actuated by any suitable means, such as a two-throw crank on a crank-shaft (not shown) driven at a suitable speed either directly or indirectly by the same motor or source of power which operates the conveyer $h$ and feeding-valve $b$, as aforesaid, or independent power may be used for operating the said conveyer and feeding valve or valves.

The various parts of the apparatus are thus arranged to work relatively to one another in such manner that a continuous supply of the fuel material is passed into and through the heated chamber $a$ and delivered thence (for instance, by falling by its own gravity or under the action of the conveyer $h$, or both) into the pressing-machine, where the same is pressed up and forced out in a core or lengths, which may be divided up into blocks or briquets of any suitable size.

The desired amount of heat may be applied to the aforesaid heated chamber in any suitable manner—for instance, by a steam or hot-water jacket or by a furnace or a flue or annulus $m$ around or partly around said heated chamber $a$, as shown, through which heat is conducted from any suitable furnace, (not shown,) or the heat may be applied internally (for instance, by making the Archimedean screw hollow and passing steam therethrough) in any suitable manner, or both.

In the drawings hereunto annexed I have shown the cylinder $j$ (or that part of same in which the ram $k$ operates) located in the flue $m$, so as to thereby keep the said cylinder heated at the point where the fuel material is first compressed; but I do not confine myself to thus heating said cylinder $j$, as I may heat same at such point, if desired, in any other suitable manner, or, if desired, I may dispense with such auxiliary heating altogether and not heat said press at all. Furthermore, I find it very advantageous to arrange a water jacket or coil or other suitable means (not shown) around the cylinder $j$ at or near the outlet $i'$ therefrom or anywhere between the latter and the point where the ram operates, through which (jacket, coil, &c.) cold water is caused to flow, or other suitable means may be employed to keep that part of the cylinder $j$ above referred to sufficiently cold or cool to thereby cool the fuel before it finally issues from the said outlet $i'$. The made fuel as it issues from said outlet $i'$ may be received or removed in any other suitable manner.

Fig. 4 shows a modified arrangement in which the fuel material after same has been heated and passed through the chamber $a$ is then received into a closed intermediate chamber $o$, (by passing through the outlet $a^2$ and inlet $o'$ into said chamber,) in which latter stirring-arms $p$ radiate from the vertical shaft $q$, driven by the bevel gear-wheel $g^\times$ on the conveyer-shaft $g$, gearing with the bevel gear-wheel $q^\times$ on the said shaft $q$. Two separate pressing-cylinders $j$ (and rams $k$ therein, respectively) are shown, into which the fuel material is fed through the respective outlets $o^2$ from said chamber $o$, leading direct into said presses, an especial object of this intermediate vessel $o$ (which may be heated or not, as desired) being to obviate any tendency to irregular feeding of the material into the press, while a further object is to provide a receptacle into which the material can continuously and freely pass from the heating-chamber $a$, and thus prevent the latter becoming blocked or choked with the fuel material therein.

When using an apparatus entirely closed in or sealed or when a sealed retort only is used, according to my present invention I find it advantageous, as well as desirable, to provide a safety-valve—i. e., pressure-valve—in connection with said retort or apparatus (or more than one such safety-valve may be used) to thus relieve any undue pressure in said retort or apparatus, and thereby obviate any chance of explosion of or damage to said apparatus from any possible excessive internal pressure arising therein.

As described with reference to Figs. 5 to 7, the press may be jacketed or otherwise provided with means to heat the same or otherwise arranged to be heated at or near the point where the first compression of the fuel takes place, and the press may be arranged in any suitable manner to be cooled at or near the outlet therefrom or otherwise suitably arranged to cool the pressed fuel before same leaves the press or while so doing.

I will now describe my improvements relating to the press and with reference to Figs. 5 to 7 of the drawings hereunto annexed.

According to my present invention I introduce the material to be pressed into shape into a cylinder or tube or chamber of any suitable shape in cross-section, (for the sake of brevity I shall hereinafter refer to these as the "chamber,") in which latter a piston-ram or plunger is arranged to be reciprocated by any suitable means, such as hereinafter explained, and I provide suitable means in combination and acting in conjunction with the aforesaid press or the aforesaid pressing-chamber therein, through or by which means I am enabled to heat the material at one point in said pressing-chamber and cool same at another point therein. For instance, both a heating-jacket and a cooling-jacket may be used in or on or with the same press—i. e., to heat the press and the material in the press at one point and at another point to cool said material while in said press, this latter operation being performed advantageously just at or near the point where the material leaves the press.

Referring to Figs. 5 to 7 of the drawings hereunto annexed, Fig. 5 shows a press having two separate jackets thereon, the one, D, being adapted to cool the pressed material, and the other said jacket, E, being adapted to heat the said material. Fig. 6 is a longitudinal section of Fig. 5. Fig. 7 is a vertical cross-section on line 3 3, Fig. 6.

I will now describe the apparatus shown in the drawings and manner of using same for fuel-making purposes.

Into the chamber A, I provide a suitable inlet B or inlets, (advantageously through the side thereof,) either controlled (or not) by one or more feeding-valves (not shown) of any suitable character to prevent escape (during feeding or from the interior of the chamber A) of the material or of any volatiles therefrom, or simple slide-valves or covers for such apertures B may or may not be used, or the ram or plunger C may form its own valve—i. e., serve to close the inlet-ports during part of its travel—according to the character of the material being pressed or results desired. Through this inlet B or in any other suitable manner the material to be pressed is fed into the interior of the chamber A in the path of travel of the aforesaid ram or plunger C therein. The latter now forces the material before it along said chamber A or it may be along an extension or prolongation of said chamber A, or both—for instance, along a passage extending, say, twelve inches (or more or less) beyond the limit of movement of the aforesaid plunger or ramhead C, the length of this said passage depending on circumstances, such as the pressure or density desired for the fuel, whether the said passage be contracted or not or intermittently closured or not, as hereinafter described—in which passage-way A the pressing up into solid or compressed form takes place, said passage-way offering sufficient resistance to cause each charge to be compressed between said mass and the plunger, and so on with each stroke of the plunger each fresh charge is thereby compressed until the fuel arrives at the point of escape or discharge from the apparatus, when it is discharged in a condition sufficiently compressed and solid for the purpose required, or if greater compression or density is required this can be obtained by contracting the passage or by intermittently closing up the passage altogether, or by prolonging the passage, or in any other desired manner.

The power necessary for operating—i. e., reciprocating—the aforesaid ram or plunger C may be applied thereto in any suitable manner from any suitable source of power—for instance, hydraulic steam, &c.—either applied direct after the manner of direct-acting steam-pumps or by cams or cranks (and suitable connections therefrom) on a shaft revolved directly or indirectly by any suitable motor.

D is cold-water jacket, having inlet and outlet D' D', by which circulation of cold water through said jacket is maintained in any suitable manner.

E is heating-jacket, having inlet and outlet E' E', by which circulation of steam or hot air or hot gases is maintained through said jacket E in any suitable manner and from any suitable source, or, if desired, the flue of a furnace may be connected up to said jacket E or the heat (flames or hot gases) from a furnace may be conducted into said jacket E or otherwise applied to heat the pressing-chamber A at or about the point of compression. It will thus be seen that at the point where the fuel material is compressed in said chamber A same is heated to any required extent (or its heat maintained) while pressing takes place, and then as said compressed fuel arrives at or near the outlet A' from said press it is cooled to any desired extent by the cooling-jacket D before said compressed fuel passes out of said outlet A'. I wish, however, to remark that one very important feature of this part of my present invention consists in providing means to heat a press of the character described, and the material within same, at the point of compression of said material in said press, and another very important feature consists in combining and arranging on the same press both means to heat said press and the material therein at one point and means to cool said press and the said material at another and separate point.

If desired, any suitable number (more than one) of compressing apparatus acting in accordance with my hereinbefore-described invention may be combined or arranged to act in conjunction or adjacent to one another, each operated from the same or separate source of power, as desired. For instance, two compressing apparatus may be arranged parallel side by side.

Any suitable packing, such as asbestos, may be mounted on the plunger or ram C or otherwise suitably arranged to bear against the inside wall of the chamber A or to bear against the plunger, or both, for the purposes of preventing (as far as possible) the material getting in between the plunger and the wall of said chamber.

I may provide any suitable means to break or saw or cut or otherwise sever the fuel into blocks or lengths either as the fuel issues from the press or subsequently. For instance, a circular cutter or saw may be used, intermittently reciprocating across the outlet from the press, or I may form or arrange a kind of cutter or knife like a guillotine to be mechanically or otherwise operated to sever the core of pressed material into lengths or blocks as said core exudes from the press.

Having thus described the nature of my said invention, what I claim as new, and desire to secure by Letters Patent of the United States, is—

1. In an apparatus for manufacturing artificial fuel, the combination of a vessel, means for heating the same, means in said vessel for agitating the fuel, and at the same time conveying it forward, and a press which receives the contents of said vessel, the whole apparatus being air-tight, whereby the volatile matters are retained in the finished blocks of fuel, substantially as described.

2. In an apparatus for manufacturing artificial fuel, the combination of a cylinder, means for heating the same, a conveyer within said cylinder, a hopper over said cylinder, an air-tight pocketed valve arranged to deliver the material in the hopper into said cylinder, means for operating said conveyer and valve, and a press connected to said cylinder and adapted to receive the contents thereof, the whole apparatus being air-tight, substantially as described.

3. In an apparatus for manufacturing artificial fuel, the combination with a cylinder, means for heating the same, a spiral conveyer in said cylinder, a hopper communicating with one end of said cylinder, a rotating pocketed valve adapted to deliver the contents of said hopper into said cylinder, means for rotating said conveyer and said valve, pressing-cylinders, plungers in said pressing-cylinders, and means for operating said plungers, the whole apparatus being air-tight, substantially as described.

4. In an apparatus for manufacturing artificial fuel, the combination with a cylinder, means for heating the same, a spiral conveyer within said cylinder, a hopper located at one end of said cylinder, an air-tight pocketed valve to deliver the material from said hopper into said cylinder, means for operating the conveyer and valve, a press to receive the contents of said cylinder, plungers in said press, means for heating one end of said press, and means for cooling the other end of said press, the whole apparatus being so arranged that it is closed at all points to prevent the escape of volatile substances even when under considerable pressure, substantially as described.

5. In an apparatus for manufacturing artificial fuel, the combination with a cylinder, means for heating the same, a spiral conveyer within said cylinder, a hopper located at one end of said cylinder, an air-tight valve to convey the contents of said hopper to said cylinder, a chamber into which said cylinder delivers, stirring-blades in said cylinder, means for operating said stirring-blades valve and said spiral conveyer, a press to receive the fuel from said chamber, plungers in said press, and means for operating said plungers, the whole apparatus being air-tight, substantially as described.

6. In an apparatus for manufacturing artificial fuel, the combination of a cylinder, means for heating the same, a spiral conveyer in said cylinder, a hopper located over one end of said cylinder, an air-tight valve to convey the contents of said hopper into said cylinder, a chamber into which said cylinder delivers, stirring-blades in said chamber, a press to receive the fuel from said chamber, plungers in said press, means for heating one end of said press and cooling the other end thereof, and means for operating the valve, conveyer, stirring-blades and plungers, the whole apparatus being air-tight, substantially as described.

H. C. B. FORESTER.

Witnesses:
H. BIRKBECK,
EDWIN GANDER.